United States Patent
Haschke (10) Patent No.: US 7,563,158 B2
(45) Date of Patent: Jul. 21, 2009

(54) AUTOMATIC RACK LOADER

(75) Inventor: Eggo L. Haschke, Deerfield, IL (US)

(73) Assignee: Poly-Clip System Corp., Mundelein, IL (US)

( * ) Notice: Subject to any disclaimer, the term of this patent is extended or adjusted under 35 U.S.C. 154(b) by 584 days.

(21) Appl. No.: 11/252,327

(22) Filed: Oct. 17, 2005

(65) Prior Publication Data

US 2007/0026776 A1 Feb. 1, 2007

Related U.S. Application Data (60) Provisional application No. 60/696,005, filed on Jul. 1, 2005.

(51) Int. Cl.
*A22C 11/00* (2006.01)
(52) U.S. Cl. .................................................. 452/141
(58) Field of Classification Search ............. 452/21–26, 452/30–32, 35–37, 46, 51
See application file for complete search history.

(56) References Cited

U.S. PATENT DOCUMENTS

| | | | |
|---|---|---|---|
| 201,049 A | 3/1878 | Robertson | |
| 1,561,664 A | 11/1925 | Rathwell | |
| 1,759,005 A | 5/1930 | Fuller | |
| 3,637,095 A | 1/1972 | Kampfer | |
| 3,899,068 A | 8/1975 | Wallace et al. | |
| 4,032,027 A | 6/1977 | Lindberg | |
| 4,277,216 A | 7/1981 | Lindberg | |
| 4,624,030 A | 11/1986 | Dreisin | |
| 4,634,333 A | 1/1987 | Butterly, Jr. et al. | |
| 4,923,354 A | 5/1990 | Giuliano et al. | |
| 5,024,576 A | 6/1991 | Meschi | |
| 5,057,055 A * | 10/1991 | Michaud et al. | 452/51 |
| 5,106,259 A | 4/1992 | Anderson et al. | |
| 5,927,927 A | 7/1999 | Anderson et al. | |
| 6,231,292 B1 | 5/2001 | Wyssmuller et al. | |
| 6,394,743 B1 | 5/2002 | Marsden et al. | |
| 6,543,983 B1 | 4/2003 | Felder et al. | |
| 6,846,147 B2 | 1/2005 | Maser et al. | |
| 7,121,940 B2 * | 10/2006 | Haschke et al. | 452/51 |
| 7,166,021 B2 * | 1/2007 | Stimpfl | 452/32 |
| 7,255,638 B2 * | 8/2007 | Stimpfl | 452/32 |
| 7,314,405 B2 * | 1/2008 | Florindo et al. | 452/31 |
| 7,357,953 B1 * | 4/2008 | Van Den Dungen et al. | 426/465 |
| 2003/0165373 A1 | 9/2003 | Felder et al. | |

* cited by examiner

*Primary Examiner*—Thomas Price
(74) *Attorney, Agent, or Firm*—Trexler, Bushnell, Giangiorgi, Blackstone & Marr, Ltd.

(57) ABSTRACT

An apparatus and system for loading items onto a rack is described. The rack loading apparatus is a conveyor having a loading side for receiving items and an unloading side for discharging items, a positioner to align a rack with the unloading side; and a load pusher to discharge the items from the unloading side onto the rack. The system is a sausage-making stuffer/clipper, a belt conveyor, a conveyor having a loading side for receiving sausages and an unloading side for discharging sausages, a positioner to align a rack with the unloading side; and a load pusher to discharge the sausages from the unloading side onto the rack.

8 Claims, 10 Drawing Sheets

AUTOMATIC RACK LOADER

PRIORITY

This application claims the benefit of U.S. Provisional Patent Application No. 60/696,005, filed on Jul. 1, 2005, which is incorporated herein by reference.

BACKGROUND OF THE INVENTION

This invention relates generally to the field of loading material onto racks. Specifically, this invention relates to loading sausages, whole-muscle meats such as hams, or other items onto racks for further processing, such as smoking or cooking. The invention will be described as used for sausages, but can be used for any items that are loaded onto a rack.

Sausages are made by filling a casing with a pasty product in a tubular shape. The pasty product is usually a mixture of minced meat and seasonings, but can also be completely or partially made of vegetarian products. The pasty product is conveyed to a filler which pumps the pasty product through a product horn and into a casing. The casing, sometimes made of an edible material such as collagen, can be made in a tubular shape or can be formed into tubes from flat sheets. As the pasty product fills the tubular casing at the end of the product horn, the sausage forms and pushes the tubular casing off the product horn. (Often, the tubular casing is itself wrapped in netting, during the same process.) When the sausage gets to the appropriate length, separators of a double clipper, such as iris gates, clamp the extruded product, apply two clips, and sever in between the two clips. One clip becomes the end of the completed sausage and the other clip becomes the beginning of the next sausage. (A stuffer can be a separate apparatus from the clipper, or both can be part of the same machine.) The sausage is then processed by smoking, cooking, steaming, or other finishing operation. The netting is usually left on the sausage during the finishing operation and may or may not be removed prior to sale to the consumer.

Illustrative processes and devices for making sausages are described in U.S. Pat. No. 5,024,041 to Urban, Process for Filling Tubular Casings and United States Published Patent Application No. 2005/0087075 A1 to Mysker, Apparatus and Method to Net Food Products in Shirred Tubular Casing, the disclosures of both of which are incorporated herein by reference.

As the sausages are produced by, for example, an apparatus as described in the '041 patent or the '075 publication, they are extruded onto a table or onto a conveyor belt. Workers are employed to lift the sausages off the table and place the sausages on a tray of a rack. A rack is a framed device, with numerous trays attached to the frame. Racks are usually about six feet in height, to be able to fit into a standard smokehouse, but can vary between different sausage manufacturer's facilities. Racks are usually on wheels and are pushed on a floor from the sausage-making machine to the smokehouse. Some racks are suspended from overhead rails. Once a worker has filled up every tray of a rack with newly-made sausages, the rack is moved into a smokehouse for finishing.

Problems arise in this method of manufacture of sausages. Sausages are raw when initially made and not particularly stiff at that time. Accordingly, it is difficult for a worker to keep a sausage completely straight, as a worker who supports a, for example, three-foot-long sausage with two hands will often find the sausage bending or sagging in the middle. Bending and sagging create unsightly blemishes in the collagen casing, displeasing to consumers. Additionally, the manual nature of the operation means some percentage of sausages will be dropped and therefore ruined. The manual nature of the operation also requires quite a bit of stooping and stretching by a worker, as the lowest tray of a rack is just inches off the floor and the highest level is often six feet off the floor.

Automated methods of accomplishing loading of sausages onto a rack are complicated by the orientation of the various parts of a sausage-making system. The discharge of a stuffer/clipper is conventionally about three-feet off the floor and is fixed in height. The trays of a rack range from the lowest rack, just inches off the floor, to the highest rack, often six feet off the floor. Accordingly, sausages extruded from the stuffer/clipper have to be lowered, lifted, or moved horizontally, depending on what tray is being filled. Additionally, even within a single sausage-making facility, the sizes and types of racks vary.

Accordingly, a need exists for an automated apparatus and method to load freshly-made sausages directly onto a rack than can be then moved for further processing. A need also exists for an automated rack loader that can be universally used with different sizes and shapes of racks. The present invention meets these needs.

BRIEF SUMMARY OF THE INVENTION

The present invention is an automatic rack loader used within a system that can include manufacturing device such as a sausage stuffer/clipper and a rack for carrying manufactured items such as sausages. In one embodiment, the loader has a conveyor having a loading side for receiving items and an unloading side for discharging items, a positioner to align the rack with the unloading side, and a load pusher to discharge the items from the unloading side onto the rack. In another embodiment, the system for loading items has a manufacturing device such as a stuffer/clipper for making sausages; a belt conveyor for receiving an item such as a sausage from the stuffer/clipper and conveying the item to a rotary conveyor, which has a plurality of stages, a loading side for receiving a sausage, and an unloading side for discharging a sausage; a rack having a frame supporting a plurality of trays; a positioner to align the rack with the unloading side; a controller to cause the rotary conveyor to align one stage on the loading side with the belt conveyor to receive an item such as a sausage from the manufacturing device and then to rotate the rotary conveyor to align the stage on the unloading side with one of the trays; and a load pusher to discharge the item off the stage and onto a tray.

In another embodiment, a cascading loading receives the sausages from the stuffer/clipper and conveys the sausages to the rotary conveyor.

BRIEF DESCRIPTION OF THE SEVERAL VIEWS OF THE DRAWINGS

The organization and manner of the structure and operation of the invention, together with further objects and advantages thereof, may best be understood by reference to the following description, taken in connection with the accompanying drawings.

DETAILED DESCRIPTION OF THE INVENTION

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The preferred embodiment of the system 20 has an automatic rack loader 120, a device for manufacturing sausages, being in the illustrated embodiment a sausage stuffer/clipper 220, a movable rack 320, and a rack positioner 420. Since, in the preferred embodiment, the system is intended to be used in a food-manufacturing environment, all components are made of stainless steel, plated metal, plastic, or other easily-cleaned and easily-sanitized material.

Figure 1:
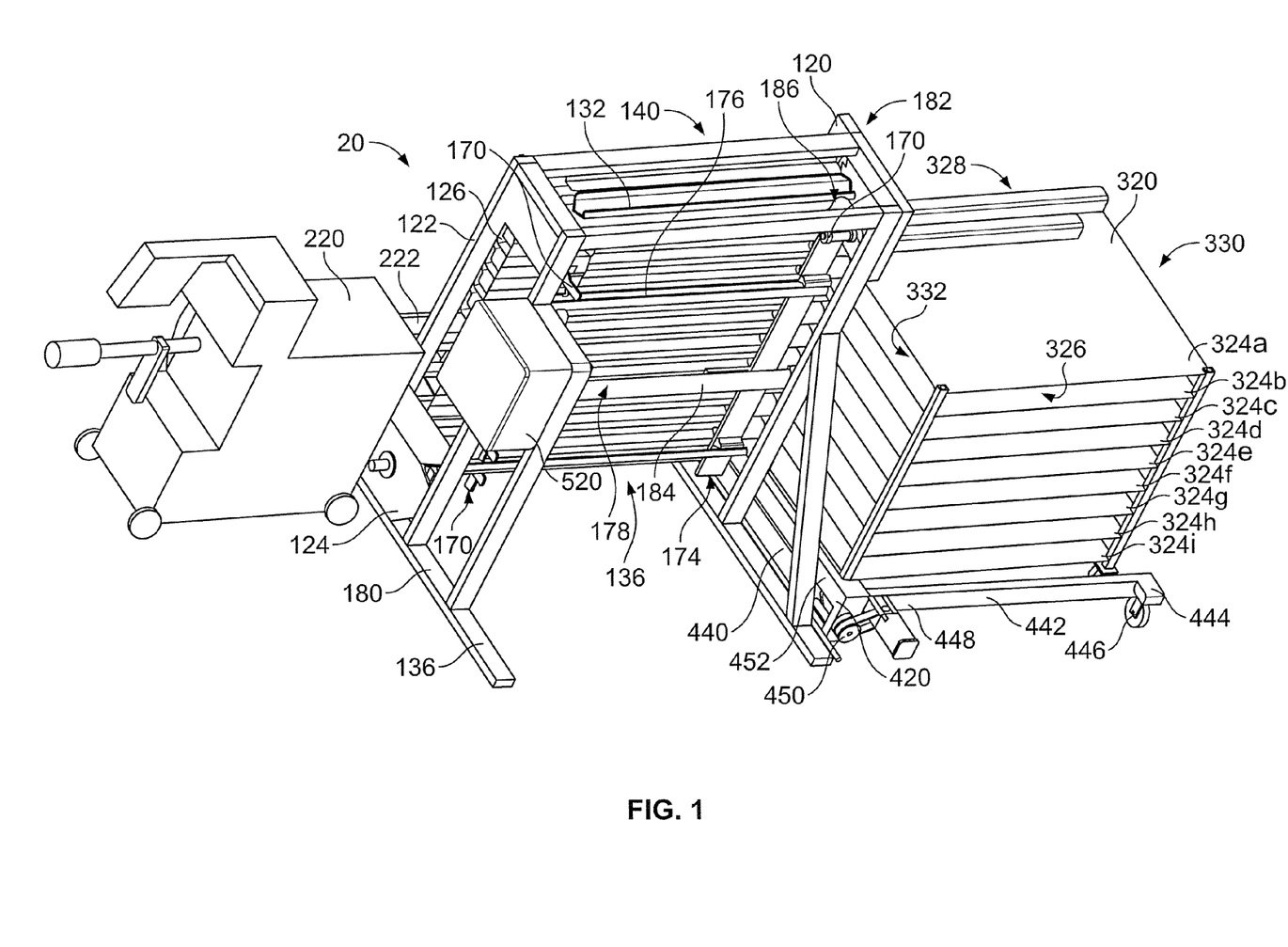
FIG. 1 is a perspective view of the unloading side of the automatic rack loader system of the preferred embodiment of the present invention.
Figure 2:
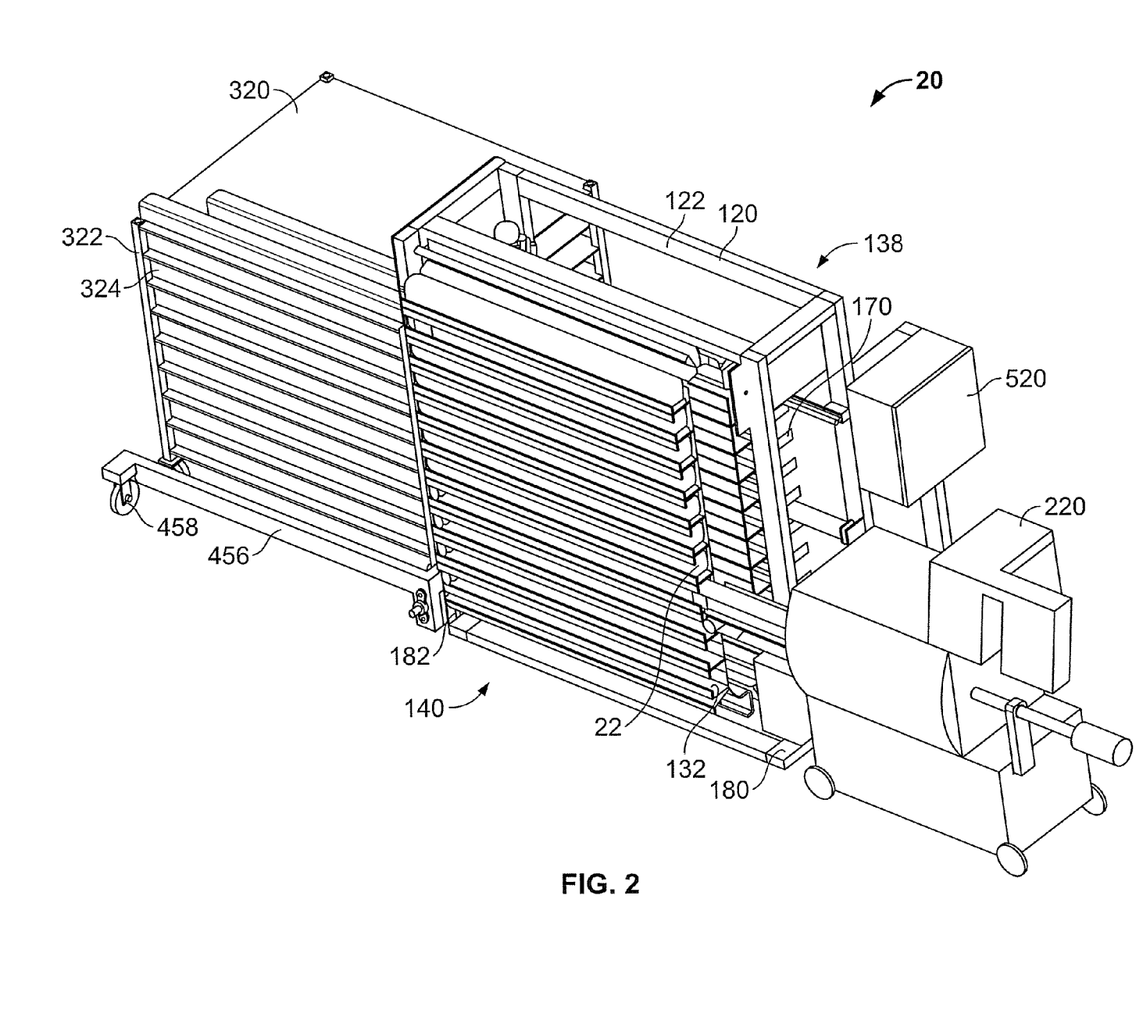
FIG. 2 is a perspective view of the loading side of the automatic rack loader system of the preferred embodiment of the present invention
Figure 3:
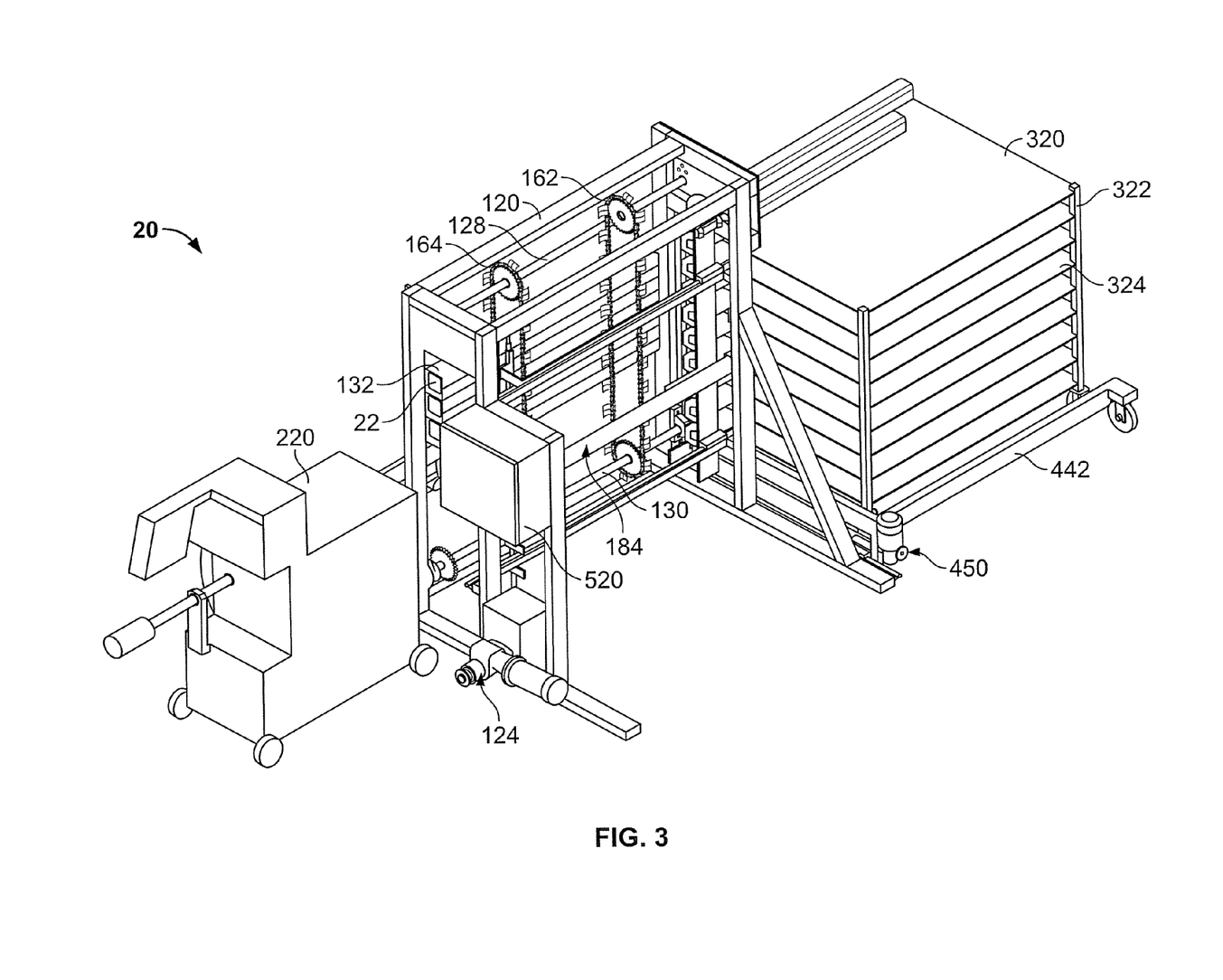
FIG. 3 is a partially-cutaway perspective view of the unloading side of the automatic rack loader system of the preferred embodiment of the present invention.
Figure 4:
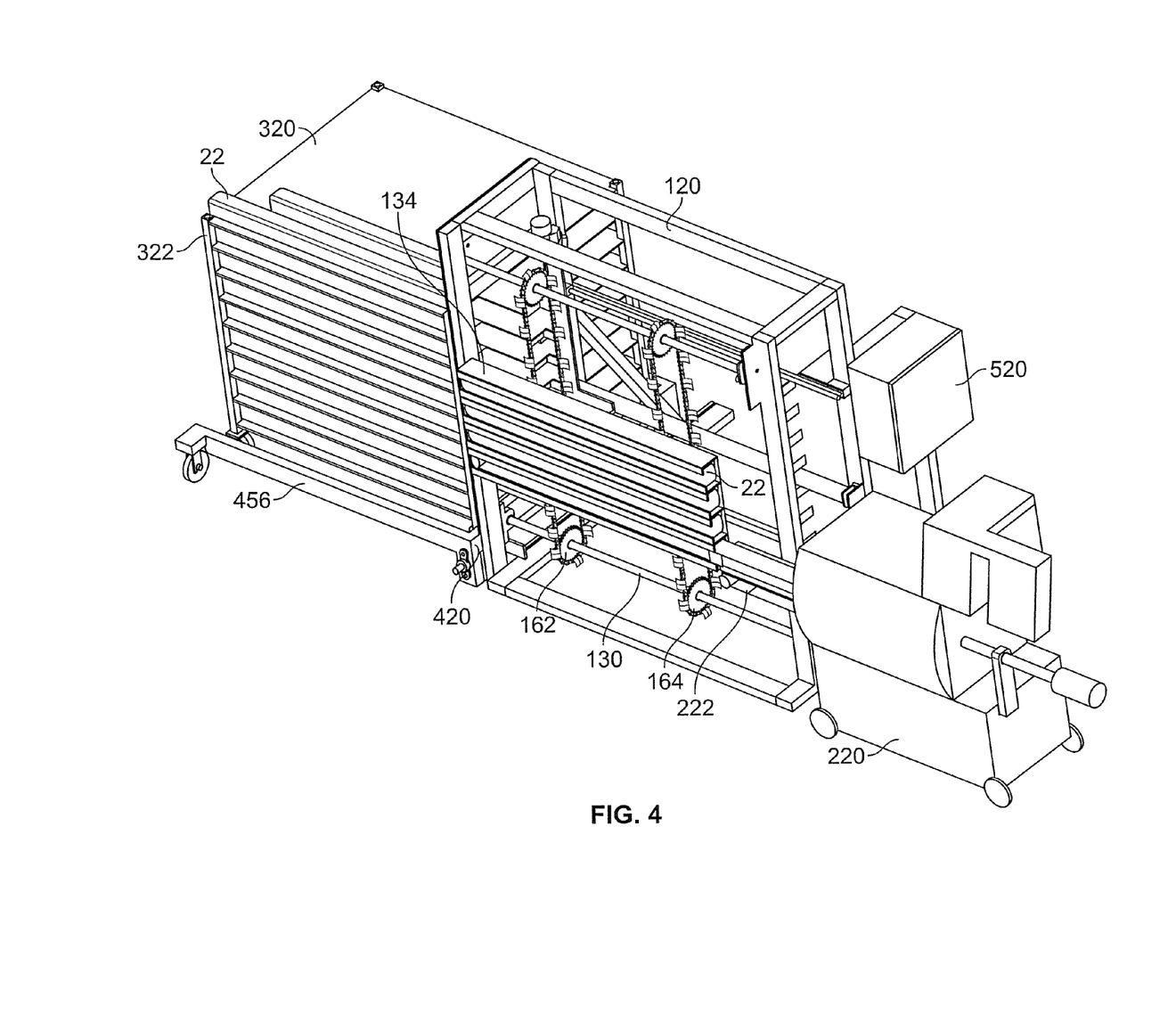
FIG. 4 is a partially-cutaway perspective view of the loading side of the automatic rack loader system of the preferred embodiment of the present invention.
Figure 5:
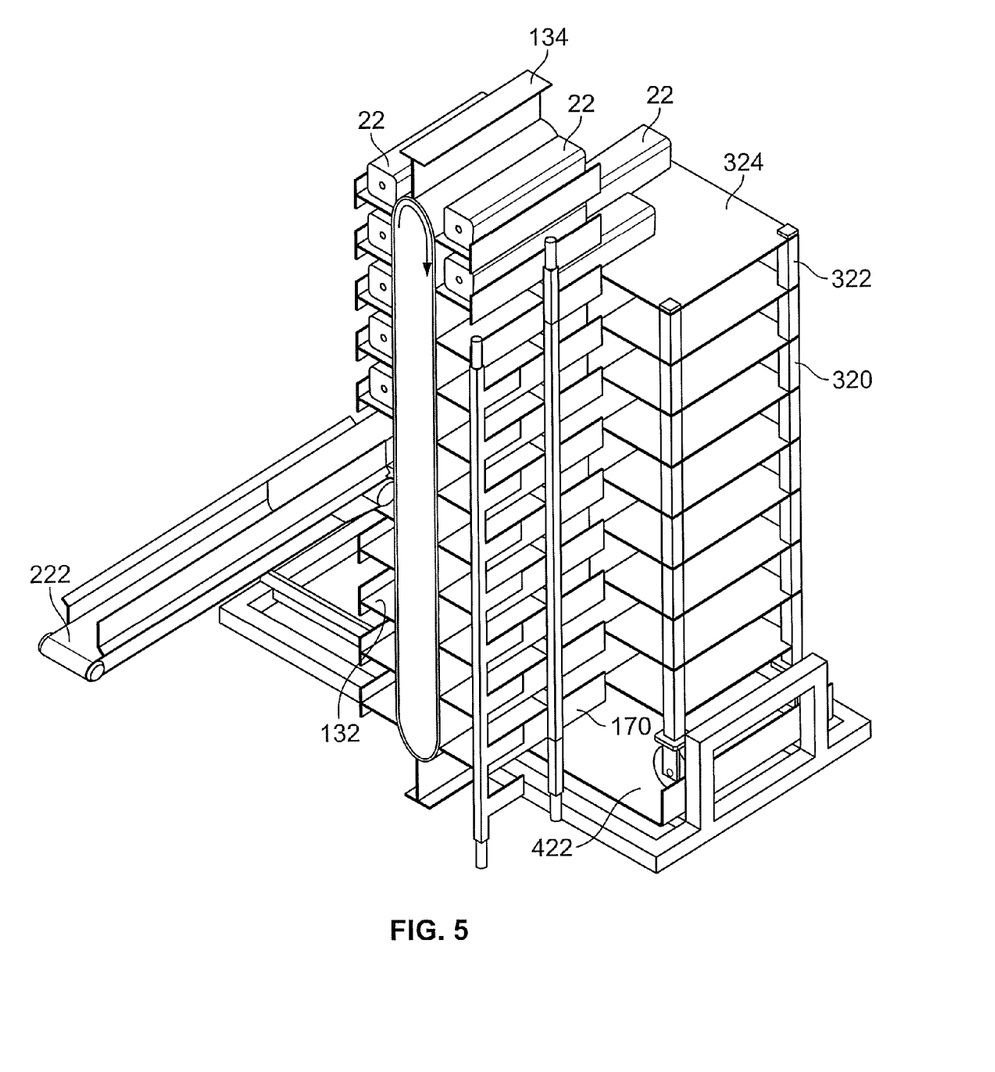
FIG. 5 is a perspective view of the unloading side of the automatic rack loader of the preferred embodiment of the present invention.

The sausage stuffer/clipper 220, as shown in FIGS. 1 and 2, is preferably capable of encasing pasty products into fibrous, collagen, or plastic casing. A filling machine, not shown, mixes meat, spices, and fillers into a pasty product and extrudes that product to a filling horn of stuffer/clipper 220, as described in the '041 patent or the '075 publication referenced above. The clipping section of stuffer/clipper 220, which is preferably a Poly-clip System Corp ICA 8700 automatic double clipper, forms a sausage 22 and conveys the completed sausage 22 onto a belt conveyor 222, which conveys the completed fresh sausage 22 to automatic rack loader 120.

In the preferred embodiment, stuffer/clipper 220 is making sausages 22. However, automatic rack loader 120 can also be used with a machine processing whole-muscle meats such as hams, or with any apparatus making or processing food or non-food items for placement on a rack.

The rack 320, shown in FIGS. 1 through 6, has a frame 322 carrying a plurality of trays 324a, 324b, 324c etc. A rack 320 conventionally is rectangular in shape and accordingly has a right side 326, a left side 328, a front side 330, and a back side 332. The present invention will work with square racks as well, however.

The invention will be described for a rack 320 carrying six sausages 22 on each of nine trays 324a through 324i (a "6×9 load pattern"). However, the rack loader 120 can be programmed for use with racks 320 having other load patterns, other numbers of trays, and of varying heights and widths. For example, a typical bologna loader is only two sausages wide.

All components are connected to and controlled in the preferred embodiment by a PLC controller 520. PLC controller has an indexer 522, preferably a Commander SK AC drive with LogicStick, such as one sold by Control Techniques division of Emerson Electric Co. The LogicStick provides PLC functionality and is preferably programmed using a PC/laptop computer with SyPTLite software and a CT Comms Cable connecting lead.

Rack loader 120, as shown in FIGS. 1 and 2, has a frame 122 carrying a motor 124 and a rotary conveyor 126. Rotary conveyor 126 is preferably a double-chain conveyor rotating on upper axle 128 and lower axle 130, as driven by motor 124, as shown in cutaway view in FIGS. 3 and 4. Motor 124 is preferably a two horsepower AC motor powering a Camco roller gear index with gearbox and IOC clutch with an SK VFD drive. A series of stages 132a, 132b, 132c, etc., are created on rotary conveyor 126 by channel supports 134, as hereinafter described, which project perpendicularly from rotary conveyor 126.

Axles 128 and 130 are separated by a space approximately equal to the height of the largest rack 320 that will likely be used with rack loader 120, with axle 128 positioned preferably above the height of the largest such rack and axle 130 positioned just above the base 136 of frame 122, which normally sits on the floor of the sausage-making room, but high enough so that channel supports 134 clear the floor as rotary conveyor 126 rotates. Accordingly, rotary conveyor 126 has a flat right side, or unloading side 138, and a flat left side, or loading side 140.

Figure 7A:
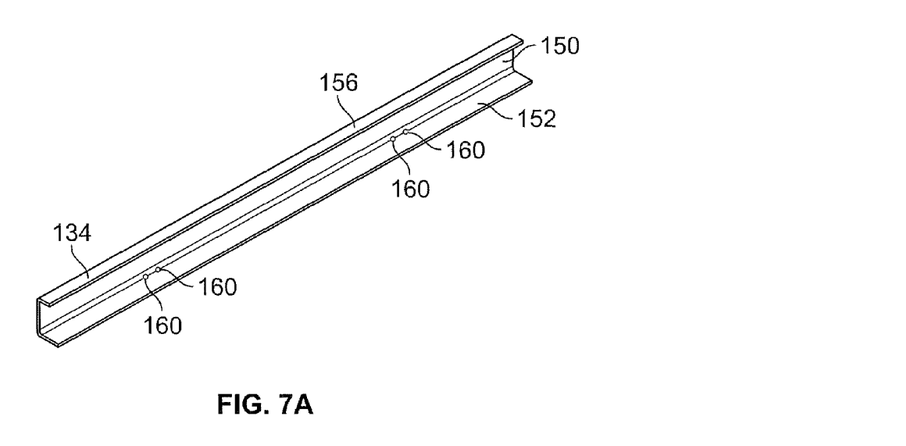
FIG. 7A is a perspective view of a channel support of the preferred embodiment of the present invention.
Figures 7B, 7C:
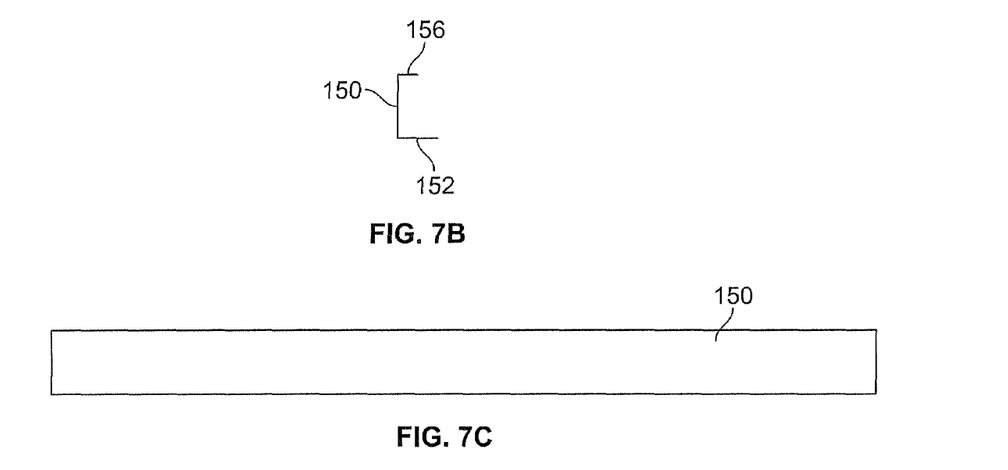
FIG. 7B is a side elevation view of a channel support of the preferred embodiment of the present invention.
FIG. 7C is a side elevation view of a channel support of the preferred embodiment of the present invention.
Figure 7D:
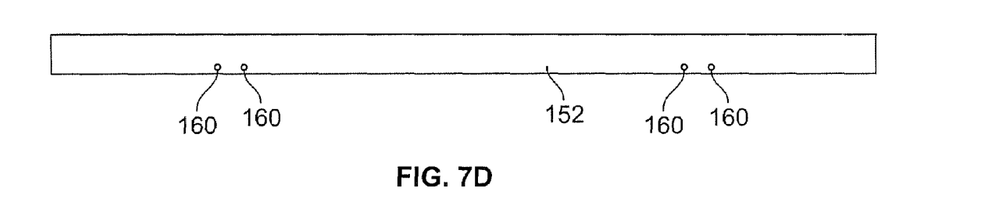
FIG. 7D is a bottom plan view of a channel support of the preferred embodiment of the present invention.

Channel support 134 is shown in perspective view in FIG. 7A, end elevation view in FIG. 7B, side elevation view in FIG. 7C, and bottom plan view in FIG. 7D. Each channel support 134 has a projecting portion 150 being a flat panel sized, in the preferred embodiment, 60 inches long by 4.5 inches high. An attachment portion 152, of the same length but, preferably, 2.75 inches wide, connects to a first side 154 of the projecting portion 150 at a 90-degree angle. A containing portion 156, of the same length but, preferably, 1.5 inches wide, connects to a second side 158 of the projecting portion 154 at a 90-degree angle. Four holes 160 in the attachment portion 152 are used to bolt channel supports 134 to the two chains 162, 164 of rotating conveyor 126. Channel supports 134, when bolted back-to-back to chains 162, 164, form a series of stages 132 closed on three sides but, since containing portion 156 is less wide than attachment portion 152, an opening 166 is formed between each pair of channel supports 134.

In the preferred embodiment, stages 132 are 5.5 inches wide (twice the width of attachment portions 152) and 4.5 inches high (the width of projecting portions 150), with an opening 166 2.5 inches wide to accommodate a pusher tab 170 as will hereinafter be described. Accordingly, loader 120 of the preferred embodiment can accommodate sausages up to 4.5 inches in diameter (or width) and up to 60 inches in length, as well as whole-muscle meats or other objects of similar dimensions. Loader 120 can be programmed through PLC controller 520 to accommodate a rack 320 of various sizes and accordingly can be used with any size rack 320 without physical modifications to the rack loader 120.

Rack loader 120 has a pusher assembly 172 to move the completed sausages off stages 132a, 132b, 132c, etc. and onto the trays 324a, 324b, 324c, etc. of rack 320. Pusher assembly 172 has an arm 174 that rides on rails 176, 178, which extend between the proximal portion 180 (toward the stuffer/clipper 220) and the distal portion 182 (away from the stuffer/clipper 220, or close to rack 320) of frame 122. Arm 174 moves between a retracted position, adjacent to the proximal portion 180 of frame 122, to an extended position, adjacent to the distal portion 182 of frame 120. An actuator 184, such as an air cylinder, preferably an Origa OSP P50 pneumatic cylinder, moves arm 174 back and forth between the retracted position and the extended position. Alternatively, other means to move arm 174, such as a belt drive, a chain drive, a screw drive, another type of hydraulic cylinder, a linkage to a motor, or other device can be used to move arm 174 back and forth.

Arm 174 also rotates in the plane parallel to the base 136 of frame 122. Pusher tabs 170a, 170b, 170c, etc., extend laterally from arm 174. A rotary actuator 186, preferably a Festo DSR rotary actuator, rotates arm 174. When arm 174 is in its retracted position, pusher tabs 170a, 170b, 170c, etc., extend away from stages 132a, 132b, 132c, etc. Before actuator 184 begins to move arm 174 from the retracted position to the extended position, rotary actuator 186 first rotates arm 174 180-degrees so that pusher tabs 170a, 170b, 170c, etc., extend through openings 166 and into stages 132a, 132b, 132c, etc. When actuator 184 returns arm 174 from the extended position to the retracted position, rotary actuator then rotates arm 174 back 180-degrees so that pusher tabs 170a, 170b, 170c, etc., no longer extend into stages 132a, 132b, 132c, etc.

Figure 6:
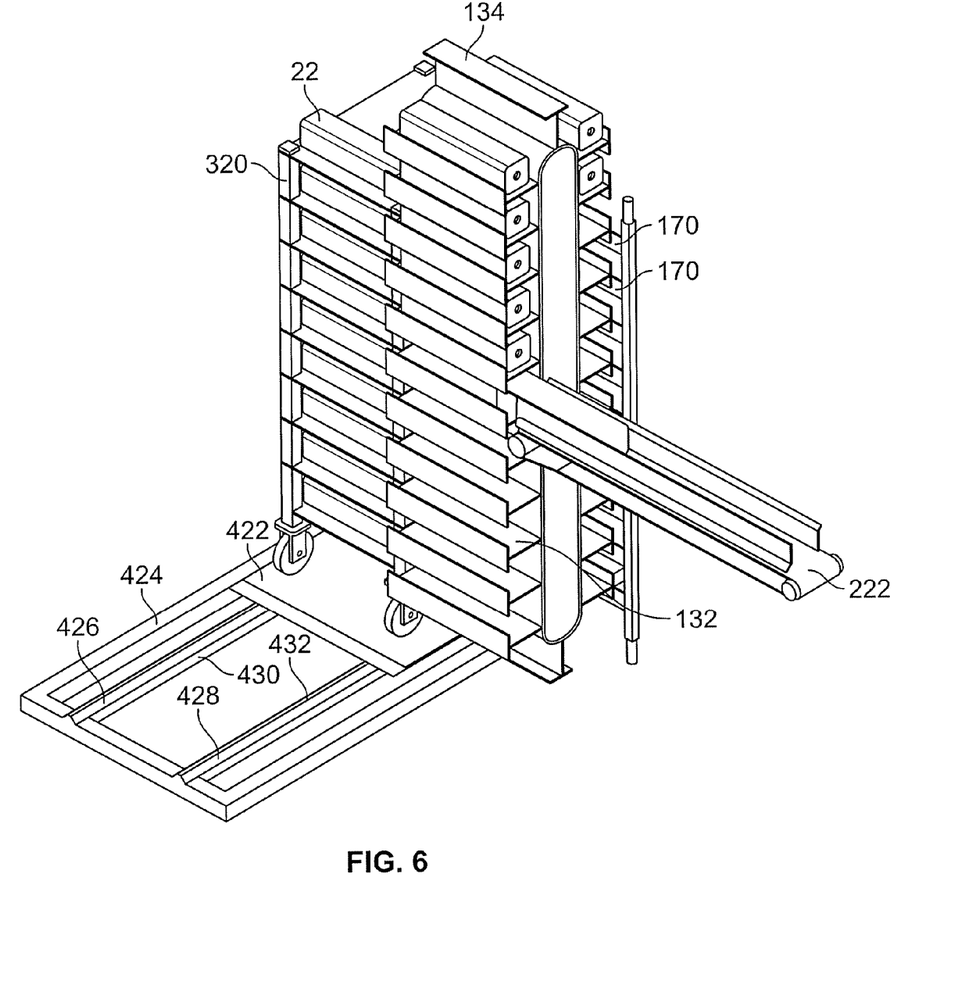
FIG. 6 is a perspective view of the loading side of the automatic rack loader of the preferred embodiment of the present invention.

Rack positioner 420 is configured to move rack 320, placed adjacent the distal portion of frame 180 of automatic rack loader 120, in a direction perpendicular to rack loader 120. In a first embodiment, as illustrated in FIG. 6, rack 320 is placed on carriage 422, which moves on support 424. As illustrated, carriage 422 slides on rails 426, 428, but carriage 422 can move on a belt or chain conveyor, on wheels, or on any other system allowing carriage 422 to move in a direction perpendicular to the direction of movement of conveyor belt 222. Carriage 422 moves preferably by air-actuated cylinders 430, 432, but can also be moved by a belt drive, chain drive, screw drive, linkage to step motor, or other similar device.

In a second embodiment, rack positioner 420 has a stop rail 440 positioned along the distal portion 182 of frame 122, a positioning rail 442 extending perpendicularly to stop rail 440 at the ride side 452 of stop rail 440, and a holding rail 456 extending perpendicularly from the left side 454 of stop rail 440, as shown in FIGS. 1 through 5. Positioning rail 442 is supported at its distal end 444 by wheel 446 and at its proximal end 448 by attachment to stop rail 440. A servo and screw drive 450, such as a THK ball screw made by Technico Inc., moves positioning rail 442 laterally from the right side 452 of stop rail 440 to the left side 454 of stop rail 440. Alternatively, a VFD gearmotor and Acme drive can be used. When a rack 320 is placed against stop rail 422 and positioning rail 442 is oriented alongside rack 320, movement of positioning rail from the right side 1452 toward the left side 454 will move rack 320 in the same direction. Holding rail 456, which is attached to stop rail 440, is also supported by wheel 458. Holding rail 456 keeps rack 320 from rolling away from positioner 420.

The operation of the automatic rack loader system will now be described. An empty rack 320 is placed at the distal end 182 of rack loader 120, and positioned so that the left side 328 of rack 320 is aligned with unloading side 138 of rotary conveyor 126 of rack loader 320. Rack positioner 420 is placed so that positioning rail 442 is adjacent to the right side 326 of rack 320. Sausages 22 are made in a conventional manner by mixing meat and spices as previously described. The pasty product is extruded through a product horn and encased in film and, optionally, netting. A hook may be applied to the clip on one end of each sausage 22. As each sausage 22 is completed, it is conveyed out of stuffer/clipper 220 on conveyor belt 222.

An indexer 522 in PLC controller 520 causes motor 124 to rotate rotary conveyor 126 to place an empty stage 132a in front of belt conveyor 222. At this point, arm 174 is in its retracted position, so pusher tabs 170a, 170b, 170c, etc. point away from the unloading side 138 of conveyor 126. Conveyor belt 222 moves a completed sausage 22 into the empty stage 132a. PLC controller 520 determines that a sausage 22 is completely inside stage 132a and rotates conveyor 126 until the next stage, 132b, is in front of conveyor belt 222, whereupon a second sausage 22 is conveyed into stage 132b. This process repeats until a predetermined number of sausages 22 have been loaded in stages 132.

In the preferred embodiment, the predetermined number of sausages 22 is two. More sausages could be placed on rotary conveyor 126, and most efficiently the number of sausages 22 placed in stages 132 would be equal to the number of trays 324 on rack 320, which is nine in the illustrated embodiment. However, large sausages are heavy and the force required to move nine sausages 22 off stages 132 and onto rack 320 would require an extremely large actuator 184. The system 20 of the present invention is intended, however, to be used with compressed air that is commonly available in many food-manufacturing operations. Accordingly, loading two or three large sausages at a time represents the best balance between a reasonably-sized actuator 184 and an efficient device. But the predetermined number of sausages can vary from one up to the number of stages 132 on rotary conveyor 126 without departing from the present invention. For smaller and lighter sausages, more can be loaded at a time. The description of the operation will proceed for loading two large sausages at a time, but the same basic operation is used for larger numbers and PLC controller 520 is easily programmed to accommodate different numbers.

When two sausages 22 have been placed in stages 132a and 132b, PLC controller 520 directs drive motor 124 to continue to rotate rotary conveyor 126 until the two stages 132a and 132b are on the unloading side 138 of rotary conveyor 126. PLC controller 520 controls the rotation so that stage 132b is aligned with the top tray 324a and stage 132a is aligned with the second-to-the-top tray 324b. PLC controller 520 directs rotary actuator 186 to rotate 180-degrees to turn pusher tabs 170 through openings 166. When pusher tabs 170 project into stages 132, they contact the back end 24 of a sausage 22. PLC controller 520 then directs actuator 184 to move arm 174 from its retracted to its extended position. As arm 174 moves from the proximal portion 180 to the distal portion 182 of frame 122, pusher tabs 170a and 170b push the two sausages 22 out of stages 132b and 132a and onto trays 324a and 324b.

PLC controller 520 next directs actuator 184 to return arm 174 to its retracted position, and for rotary actuator 186 to move pusher tabs 170 out of stages 132. Simultaneously, stuffer/clipper 220 makes another sausage 22, which is extruded onto conveyor belt 222 and then into the next available empty stage 132. When two sausages 22 have been loaded in adjacent stages 132, PLC directs motor 124 to rotate to align those two stages with trays 324c and 324d. Rotary actuator 186 rotates to move pusher tabs 170 into stages 132 and actuator 184 moves arm 174 from its retracted position to its extended position, thereby moving the two sausages 22 onto trays 324c and 324d. This process continues until each tray 324a through 324i carries a sausage 22 on the left side 328. Please note that, in the illustrated embodiment, rotary conveyor 126 will have to make five trips to fill the left side 328, with the last trip carrying only one sausage 22, because rack 320 as illustrated has nine trays 324 and loader 120 is loading two sausages 22 at a time.

When rack 320 has its left column filled with sausages, PLC controller 520 directs screw drive 450 to move positioning rail 442 a distance equal to the width of the sausages 22 being made. This movement moves rack 320 a corresponding distance. Loader 120 then continues as described above, until each tray 324 has two sausages 22. Rack positioner 420 moves rack 320 another distance to the left and loader 120 continues as described above, until rack 320 has six sausages 22 on each tray 324. PLC creates an alert signal, which can be audible, visual, or a combination of the two. A worker then removes full rack 320 and replaces it with an empty one, whereupon the process continues.

In another embodiment, arm 174 is movable not only between its retracted position and its extended position, but also up and down. Actuator 184 in this embodiment must be a dual-motion actuator. In this embodiment, pusher tabs 170 are removable, and only the number of pusher tabs 170 corresponding to the number of sausages to be loaded per trip are used. In the illustrated embodiment, then, only the bottom two pusher tabs 170h and 170i are used. When two sausages 22 are in stages 132a and 132b and aligned with trays 324a and 324b of rack 320, actuator 180 first lifts arm 174 until pusher tabs 170h and 170i are aligned with stages 132a and 132b. Rotary actuator 186 turns arm 174 to swing pusher tabs 170h and 170i through openings 166, actuator 184 moves arm 174 from its retracted position to its extended position, and the two sausages 22 are pushed onto trays 324a and 324b. The process repeats, only on the second trip, actuator 184 raises arm 174 until pusher tabs 170h and 170i and stages 132 are aligned with trays 324c and 324d. The process continues as described above.

Since the pusher tabs 170 are only used on two stages at a time, this embodiment has the advantage that the other stages 132 can contain sausages at the same time. For example, loader 120 can load nine sausages 22 onto stages 132a through 132i. Rotary conveyor 126 carries those sausages 120 to the loading side 140, where they are pushed two at a time onto trays 324a through 324i (with, in the illustrated embodiment, of course, only one sausage 22 at a time pushed off on the last actuation).

In another embodiment, a cascading loader 620 is used to load sausages 22 onto automated rack loader 120. Instead of stuffer/clipper 220 discharging sausages 22 directly onto a stage 132 of automated rack loader 120, as described above, stuffer/clipper discharges sausages onto cascading loader 620, which then rolls sausages 22 onto a stage 132.

Figure 8A:
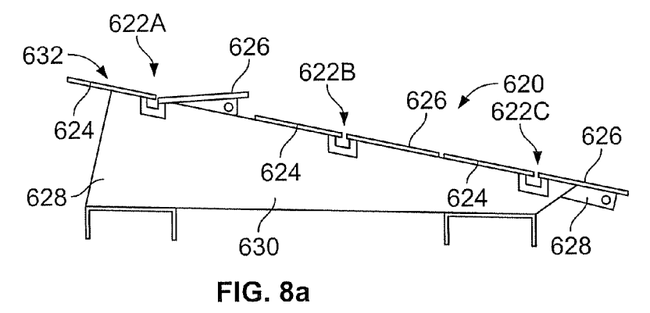
FIGS. 8A, 8b, and 8C are side, top perspective, and bottom perspective views of the cascading loader of another embodiment of the present invention.
Figure 8B:
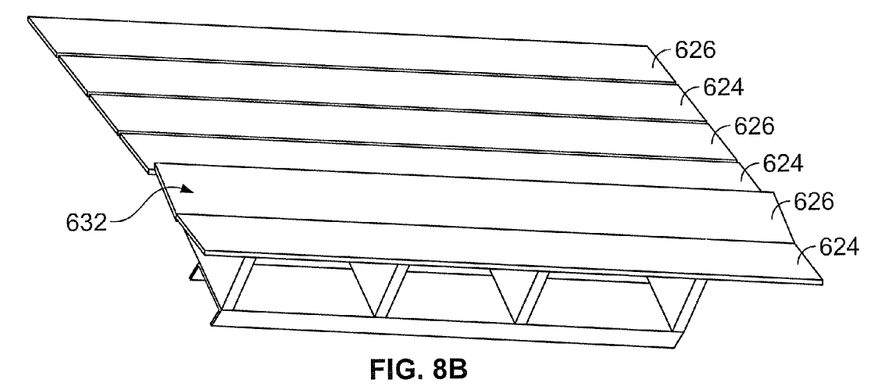
Figure 8C:
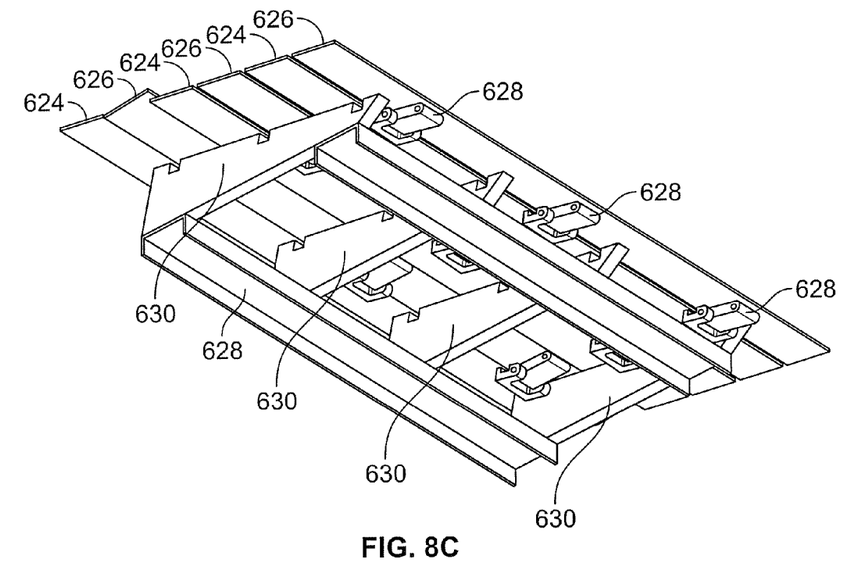

Cascading loader 620 has a series of tiers 622, preferably three tiers 622A, 622B, and 622C, as shown in side view in FIG. 8A and in perspective view in FIGS. 8C and 8C. Each tier 622 has a stationary platform 624 and a movable platform 626, which are connected by one or more hinges 628. Both stationary platform 624 and movable platform 626 are rectangular members, having a length approximately equal to the length of stages 132, and having a width approximately two-thirds the diameter of the largest sausages 22 that are expected to be loaded. The platforms 624, 626 are preferably made of smooth stainless steel. In another embodiment, platforms 624, 626 are coated with a material such as is sold under the brand name Teflon™.

The stationary platforms 624 of tiers 622A, 622B, and 622C are mounted to frame member 628, which is mounted to legs 630. Legs 630 can sit on the floor next to frame 122 on loading side 140 of rotary conveyor 126. Alternatively, legs 630 can be secured to frame 122, or can be an extension of frame 122. Frame member 628 has angular struts 630, so that each successive tier 622 is slightly lower than the preceding tier 622. As illustrated, tier 622A is higher than tier 622B, which is higher than tier 622C.

Each movable platform 626 moves from a first position, in which movable platform 626 is raised and forms an obtuse angle with stationary platform 624, to a second position, in which movable platform 626 is essentially coplanar with the stationary platform 624 of its own tier 622 and with the stationary platform of the next lower tier 622. As shown in FIG. 8A, movable platform 626 of tier 622A is raised to the first position and movable platforms 626 of tiers 622B and 622C are in the second position. Accordingly, the platforms 624, 626 of tier 622A, as shown in FIG. 8A, form an obtuse angle, defining a passage 632 in which the sausage 22 will be placed. Movable platform 626 of tier 622B, being in the second position, is essentially coplanar with both stationary platform 624 of tier 622B and with stationary platform 624 of tier 622C, and accordingly passageway 632 no longer exists. A sausage 22 can therefore roll out of tier 622B and into tier 622C.

Please note that the number of tiers 622 can be from one up to whatever number the user desires to use. The cascading loader 620 shown in FIGS. 8A, 8B, and 8C has three tiers 622A, 622B, and 622C. The cascading loader 620 shown in FIG. 9 has two tiers 622A and 622B.

Hinges 628 are preferably electronic hinges, controlled by PLC controller 520. Alternatively, air cylinders, push rods, or other suitable means of moving movable platforms 626 between the first position and second position can be used.

Figure 9:
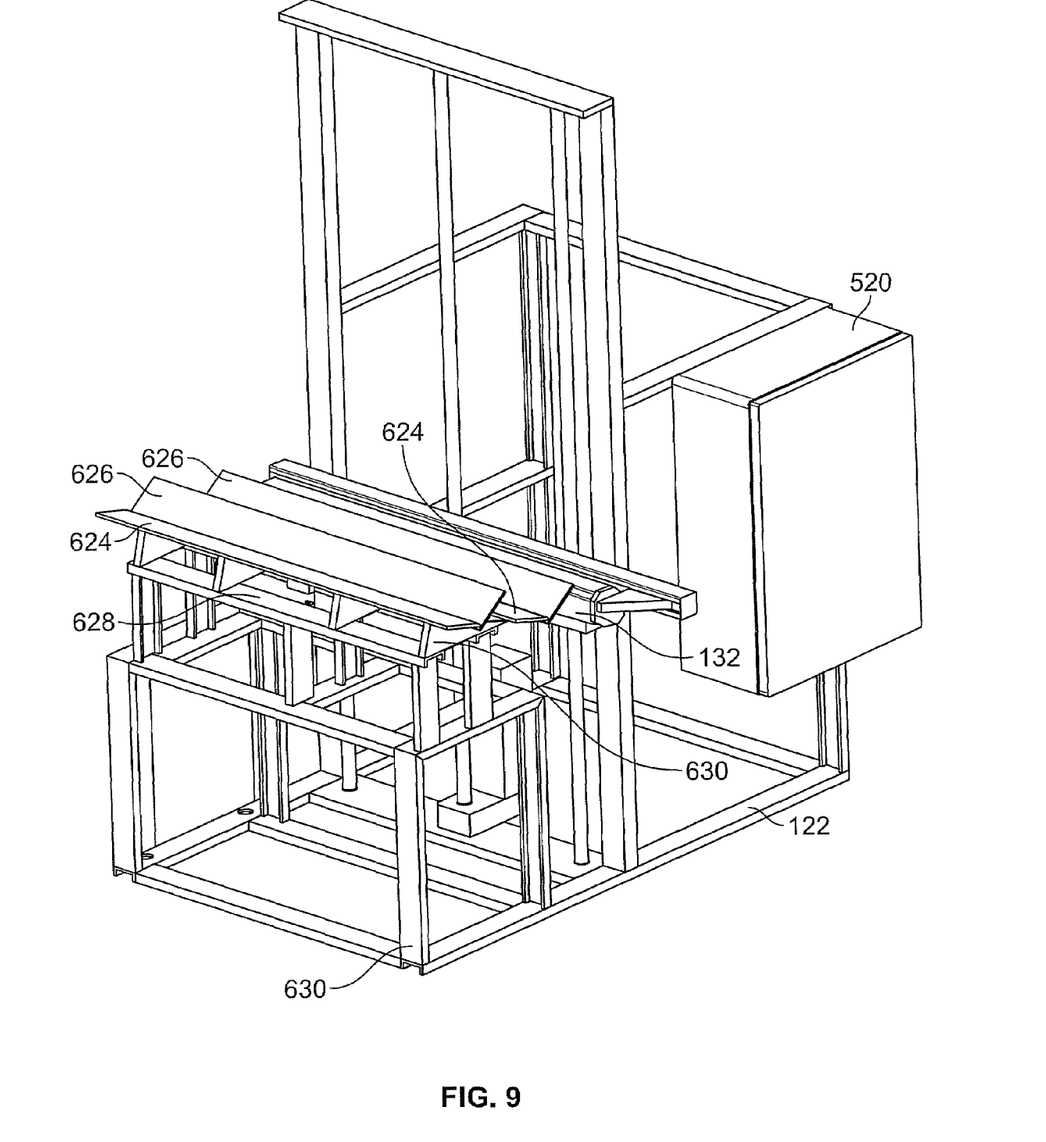
FIG. 9 is a perspective view of the cascading loader shown as mounted next to the automated loader of the present invention.

Cascading loader 620 is shown placed next to automated rack loader 120 and attached to frame 122, in FIG. 9. (For clarity, other elements of the system 20 are not shown.)

In operation, a sausage 22 produced as described above and is extruded from stuffer/clipper 222. Instead of moving directly onto stage 132a, as described above, however, sausage 22 is extruded onto tier 622A, when movable platform 626 is in its raised position. The two platforms 624, 626 of tier 622A, since they form a V-shape, hold sausage 22 in place within passageway 632. When PLC controller determines that stuffer/clipper 222 has completed manufacture of a sausage 22 and sausage 22 is completely within tier 622A, movable platform 626 of tier 622A descends to the second position as movable platform 626 of tier 622B rises to the first position. The sausage 22 according rolls from tier 622A to 622B and is held in the V-shape of tier 622B. After a short pause, movable platform 626 of tier 622B descends to its second position as movable platform 626 of tier 622C rises to its first position. The sausage 22 then rolls from tier 622B to tier 622C. After a short pause, movable platform 626 of tier 622C descends to its first position, allowing the sausage 22 to roll off tier 622C and onto stage 132a. Conveyor 126 then rotates as described above until the next stage, 132b, is adjacent to tier 622C. In the meantime, the next sausage is being made by stuffer/clipper 222 and is being extruded onto tier 622A, for cascading down through tiers 622A, 622B, and 622C and onto stage 132b, as just described.

In this manner, sausages 22 can be gently rolled onto the stages 132 of conveyor 126, minimizing any shock to the sausages 22.

Figure 10:
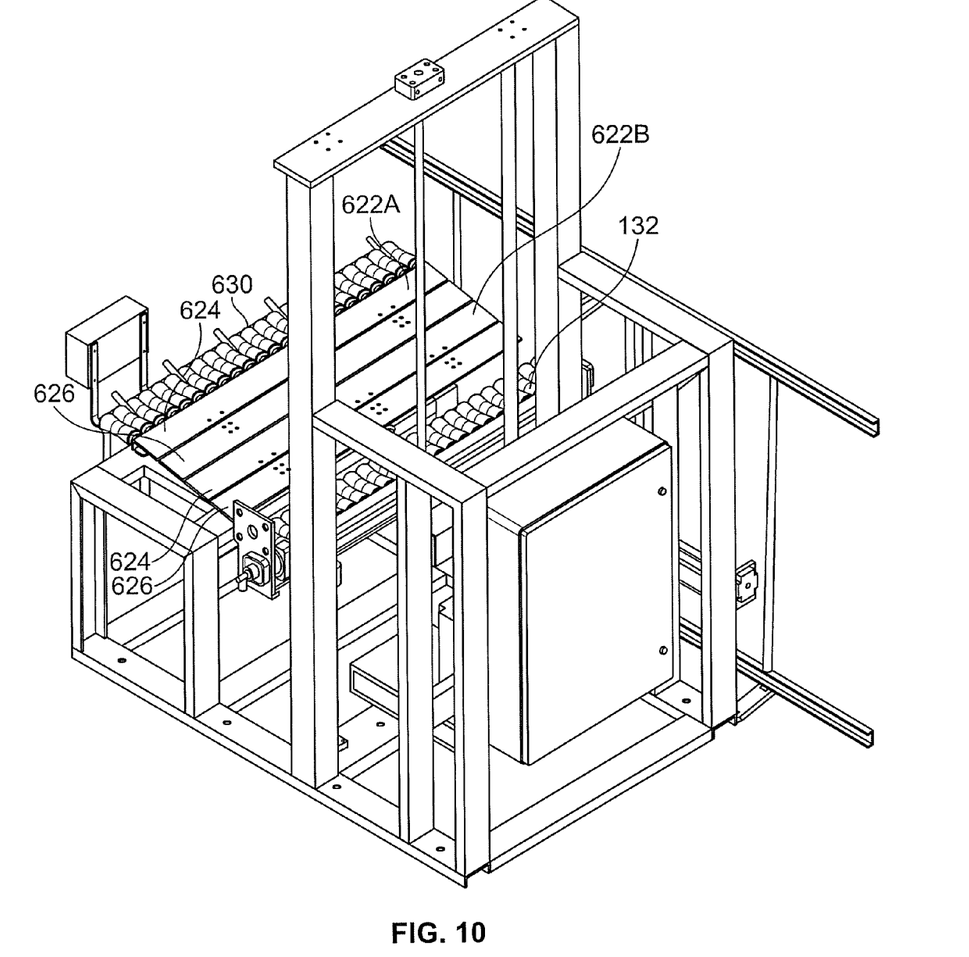
FIG. 10 is a perspective view of another embodiment of the cascading loader.

In yet another embodiment, as shown in FIG. 10, cascading loader 620 has a roller tray 630, as shown in FIG. 10. Roller tray 630 has a series of rollers mounted transversely to the direction of movement of sausages 22 during the extrusion process. Accordingly, as sausages 22 extrude from stuffer/clipper 222, sausages 22 roll onto roller tray 630, thereby preventing any chafing or abrasion to the sausage casings. The rollers of roller tray 630 have a slight hemispherical shape to accommodate round sausages, as is well known in the art of roller trays.

After a sausage 22 is extruded onto roller tray 630, roller tray 630 tilts to roll the sausage onto tier 622A. An air-actuated cylinder or similar device can be used to tilt roller tray 630. After the sausage 22 rolls onto tier 622A, the process continues as described above.

In yet another embodiment, also shown in FIG. 10, each stage 132 also is a roller tray. As a sausage 22 is pushed off each stage 132 and onto a tray 324, chafing and abrasion to the surface of sausage 22 is minimized because the sausage 22 is rolling off stage 132.

While preferred embodiments of the present invention are shown and described, it is envisioned that those skilled in the art may devise various modifications of the present invention without departing from the spirit and scope of the appended claims.

I claim:

1. An apparatus for loading items onto a rack having a plurality of trays, comprising:
   a rotary conveyor having a loading side for receiving items and an unloading side for discharging items;
   a positioner to align the rack with said unloading side;
   a load pusher to discharge the items from said unloading side onto said rack, said load pusher comprising a plurality of tabs extending on a rotatable arm; and
   a loader for moving the items onto said rotary conveyor, said loader comprising a plurality of cascading tiers, each of said cascading tiers comprising a stationary platform and a movable platform hingedly attached to said stationary platform and movable from a first position essentially coplanar to said movable platform to a second position defining a passageway with said stationary platform to hold the item.

2. The apparatus of claim 1, wherein said loader further comprises a roller tray.

3. The apparatus of claim 1, wherein said conveyor further comprises a plurality of stages for holding items.

4. The apparatus of claim 3, wherein said stages comprise roller trays.

5. The apparatus of claim 1, wherein said positioner comprises a carriage.

6. The apparatus of claim 1, wherein said load pusher comprises a plurality of tabs extending on a rotatable arm.

7. The apparatus of claim 6, wherein said load pusher further comprises an actuator to adjust an elevation of said arm.

8. The apparatus of claim 1, further comprising a controller to cause said rotary conveyor to align a one of a plurality of stages on said loading side to receive an item from a stuffer/clipper and to cause said rotary conveyor to rotate to align said one of said plurality of stages on said unloading side with a one of the plurality of trays.

* * * * *